United States Patent [19]

Tamer

[11] 4,430,671
[45] Feb. 7, 1984

[54] TELEVISION CHANNEL INDICATOR WITH AUTOMATIC ON-SCREEN DISPLAY

[75] Inventor: Gregory G. Tamer, Indianapolis, Ind.

[73] Assignee: RCA Corporation, New York, N.Y.

[21] Appl. No.: 352,002

[22] Filed: Feb. 24, 1982

[51] Int. Cl.³ .............................................. H04N 5/50
[52] U.S. Cl. .................................................. 358/192.1
[58] Field of Search ............................. 358/192.1, 183

[56] References Cited

U.S. PATENT DOCUMENTS

| | | | |
|---|---|---|---|
| 3,526,707 | 9/1970 | Skinner et al. | 358/192.1 |
| 3,812,285 | 5/1974 | Miyata et al. | 178/5.8 |
| 3,984,828 | 10/1976 | Beyers, Jr. | 340/324 AD |
| 4,081,797 | 3/1978 | Olson | 340/324 AD |
| 4,119,955 | 10/1978 | Nichols | 340/324 AD |
| 4,139,860 | 2/1979 | Micic et al. | 358/22 |
| 4,259,689 | 3/1981 | Bonner et al. | 358/165 |
| 4,319,286 | 3/1982 | Hanpachern | 360/33 |
| 4,321,596 | 3/1982 | Hernandez et al. | 340/724 |
| 4,333,110 | 6/1982 | Faerber et al. | 358/165 |
| 4,366,502 | 12/1982 | Shiu | 358/192.1 |

FOREIGN PATENT DOCUMENTS 2920016 11/1979 Fed. Rep. of Germany .
7903922 11/1979 Netherlands .

OTHER PUBLICATIONS

"The Practical Application of On-Screen Display to a Television Receiver", Olson and Brennan, IEEE, Aug. 1973, vol. BTR-19, No. 3.
Data Sheet MM58146 Display IC, National Semiconductor Corp., Santa Clara, California.

Primary Examiner—John C. Martin
Assistant Examiner—Michael D. Parker
Attorney, Agent, or Firm—Eugene M. Whitacre; Paul J. Rasmussen; Clement A. Berard, Jr.

[57] ABSTRACT

A television receiver which can display an on-screen indication of the number of the selected TV channel includes apparatus for providing such display automatically at times when the normal TV picture becomes blanked or black. In addition, the channel number display can be provided in small characters when the picture is normal and in enlarged characters when the picture is substantially black.

15 Claims, 4 Drawing Figures

TELEVISION CHANNEL INDICATOR WITH AUTOMATIC ON-SCREEN DISPLAY

The present invention relates to apparatus for displaying an auxiliary character display on a television screen and, in particular, to apparatus producing such display in response to a predetermined condition of the image normally produced for indicating, e.g., the selected channel.

An on-screen display on the channel number of a selected television (TV) channel is convenient for the viewer because the character size can be sufficiently large to be easily readable. It is further advantageous in that it avoids the complexity and expense of a separate readout device. Typically such on-screen displays of the channel number are not continuously "on" but must be "recalled" by the viewer. Accordingly, on-screen displays are most often employed in TV receivers equipped with a remote control device wherein the display is developed for a period of time following a user action, such as depressing a "recall" button or initiating a change in channel selection or volume level.

In a TV receiver not having a remote control device a conventional on-screen channel number display tends to be convenient because the viewer would have to walk over to the receiver in order to recall the display. This disadvantage is avoided by the present invention which automatically causes the channel number to be displayed when certain conditions occur.

The inventor has noticed that commercial television programming fades to a substantially black picture condition at fairly regular and frequent intervals, such as during the transition between a featured program and a commercial message. Developing an on-screen channel number indication at those times provides a convenient way in which to remind the viewer of the channel to which the TV receiver is tuned. If the display ensures for a short period, e.g., two to five seconds, that will be sufficient to remind the viewer without being distracting or annoying.

Accordingly, the apparatus of the present invention for developing a character display on a display device comprises a device for generating character signals to produce a character on the display device in response to a command signal which is developed in response to detection of a predetermined amplitude condition of a video signal.

Figure 1:
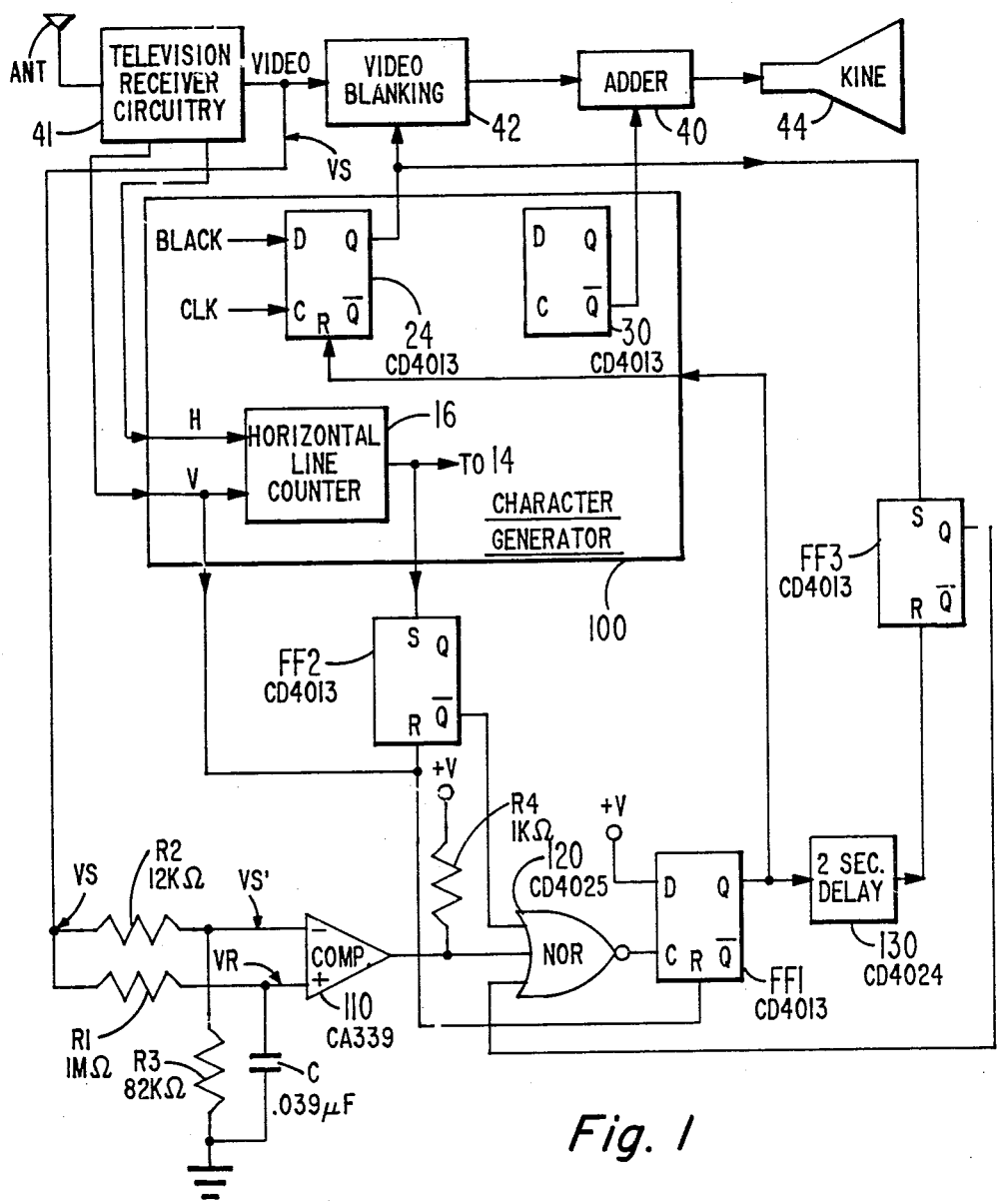
FIG. 1 is a schematic diagram, partially in block diagram form, of a television receiver including the present invention.

In the television receiver of FIG. 1, radio frequency TV signals are received by antenna ANT and are converted to video signals VS by television receiver circuitry 41 which includes tuning circuitry, demodulation circuitry, synchronization and deflection circuitry. The video signals VS pass through video blanking device 42 and adder 40 to kinescope 44 upon which an image is produced in response to the video signals. Horizontal and vertical synchronization is extracted from video signal by the synchronization circuitry within television receiver circuitry 41 and is supplied as horizontal synchronization pulse signal H and vertical synchronization pulse signal V to character generator 100. The TV receiver thus far described is conventional.

Characters indicating, for example, the selected channel number and time are displayed on the screen of kinescope 44 in response to character signals generated by character generator 100. Pertinent portions of character generator 100 include flip-flop (bistable multivibrator) 24 which supplies a black signal to video blanking device 42 and flip-flop 30 which applies a white signal to adder 40 to together produce white numerals with black edging on kine 44. Character generator 100 is explained below in relation to FIG. 2.

The remaining circuitry of FIG. 1 responds to a predetermined amplitude condition of video signal VS corresponding to a substantially black or blank image to control character generator 100 in accordance with the present invention.

Figure 2:
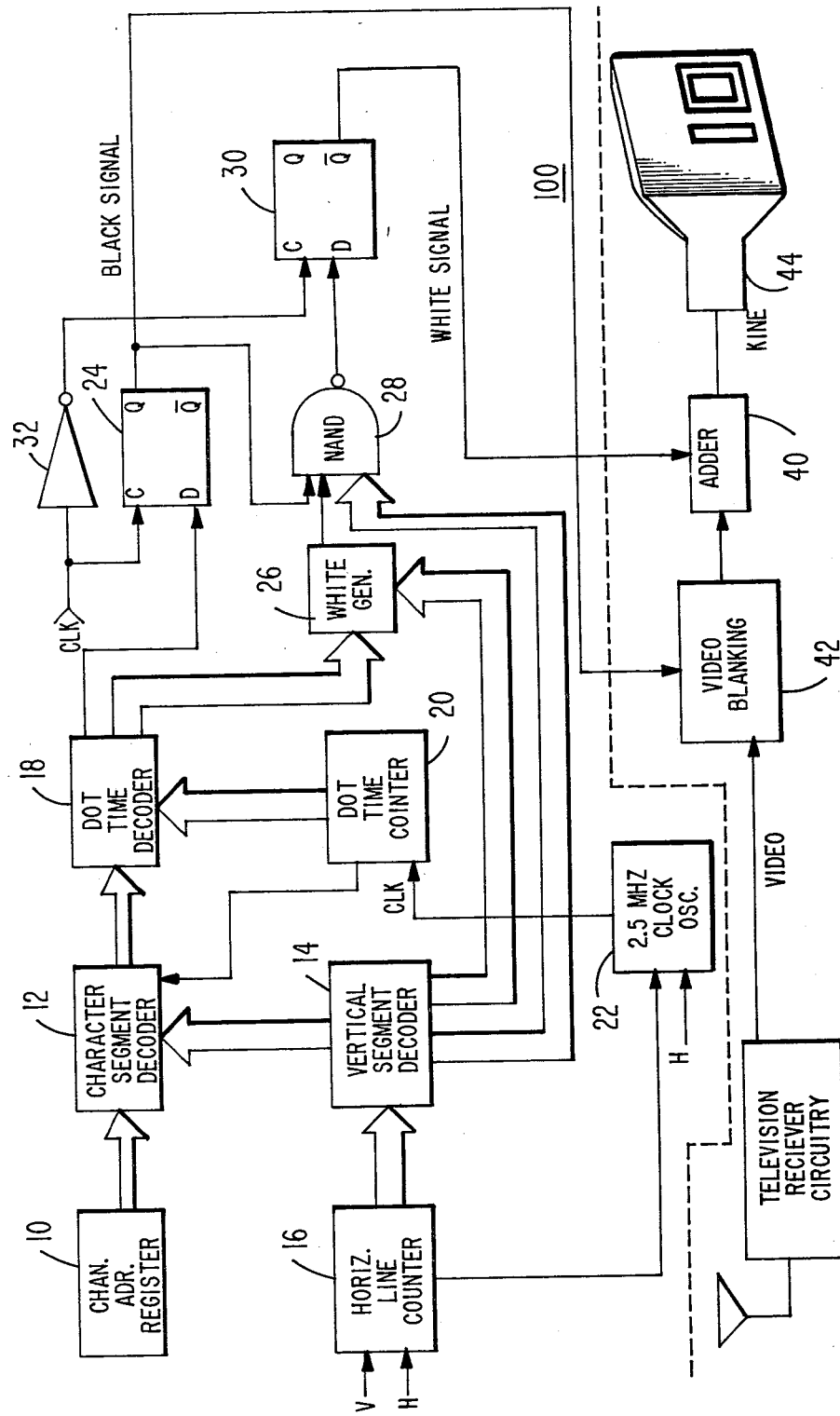
FIG. 2 is a schematic diagram in block diagram form of a portion of the TV receiver shown in FIG. 1.

With reference to character generator 100 shown in FIG. 2 in which plural signal lines are indicated by broad arrows, a channel address register 10 is coupled to supply BCD channel number signals to a character segment decoder 12, wherein vertical and horizontal bar or segment-representative signals are generated. Decoder 12 further receives enabling signals from a dot-time counter 20 and an image-segment-representative signal from a vertical segment decoder 14. Decoder 14 provides signals representative of the vertical height (in terms of the number of horizontal scan lines) required for each of the vertical and horizontal bar character segments in response to horizontal line count signals supplied from counter 16. Height-representative signals corresponding to the desired digit segments to be displayed are provided by decoder 12 to a dot-time decoder 18, which appropriately limits the horizontal time duration (width) of the decoder 12 signals so as to form the appropriate segment signals from which the character is developed. Decoder 18 is controlled by means of a dot-time counter 20 which receives relatively high frequency clock signals from a clock oscillator 22 and couples horizontal timing signals to decoder 18.

The image-segment-representative signals provided by dot-time decoder 18 are coupled to a flip-flop 24 and a white signal generator 26. Flip-flop 24 also receives clock signals from oscillator 22. The signals provided by flip-flop 24 are coupled to blanking circuit 42 for blanking video signals generated by the television receiver 41. By blanking the television receiver video signal by means of the generated character signals, a black character is reproduced on the television kinescope.

Generator 26 further receives appropriate blanking signals from decoder 14 and blanks portions of the signals provided by decoder 18 in the regions corresponding to the borders of the horizontal bar segments. Signals provided by generator 26 are coupled to a NAND gate 28 which also receives blanking signals from decoder 14 and black signals from flip-flop 24. Gated signals from NAND gate 28 are coupled to a flip-flop 30. Flip-flop 30 receives clock signals from oscillator 22 through an inverter 32 and provides a one-half clock-time delay to the applied signals.

Signals provided by flip-flops 24 and 30 respectively represent a relatively larger character edging signal (black signal) and a relatively smaller character-bodyrepresentative signal (white signal) centered in time within the edging signal.

A character having, for example, black edging and a non-black body is formed by forming a black character and by superimposing over such black character, the same character in a smaller size and different color or brightness. The smaller character is illustratively referred to as white in color but could be any non-black or contrasting color. To this end, the white signal provided by flip-flop 30 is added to the video signal in adder 40 during the interval when video is blanked by the black signal of flip-flop 24. The resultant image reproduced on kinescope 44 contains video signals as received by the television receiver circuitry and a blanked region in which a white character outlined in black is inserted. This is illustrated in FIG. 2 in which the character "10" is shown (enlarged in relative size for clarity) on the face of kinescope 44.

In order to display the selected digit in a preselected portion of the television screen, signals provided by clock oscillator 22 are inhibited by signals provided by counter 16 except during scanning of the preselected region, for example, horizontal scan lines 192-211.

It is noted that by gating the particular signals provided by generator 12 with the signals provided by counter 20, the resultant characters generated by decoder 18 and subsequent circuitry are assured of having relatively uniform and stable leading and trailing edges. A relatively high stability is achieved in the gating signals produced by counter 20 by utilizing a relatively high frequency (e.g., 2.5 MHz) clock oscillator 22 that is synchronized with the horizontal scan frequency of the associated television receiver.

Character generator 100 is completely described in U.S. Pat. No. 3,984,828 entitled, CHARACTER GENERATOR FOR TELEVISION CHANNEL NUMBER DISPLAY WITH EDGING PROVISIONS, issued to B. W. Beyers, Jr. On Oct. 5, 1976, which is incorporated herein by reference. Character generators of the sort described in Beyers' patent are commercially sold in integrated circuit form, such as the MM58146 sold by National Semiconductor Corp., Santa Clara, Calif.

Figure 3:
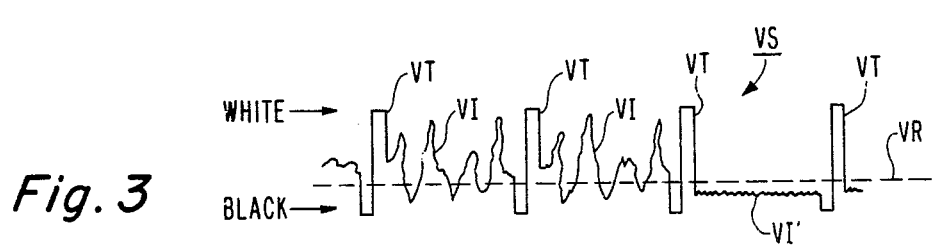
FIG. 3 is a diagram of electrical signal waveforms in the TV receiver of FIG. 1.

FIG. 3 shows the waveform of a video signal VS developed at the output terminal of television receiver circuitry 41 over a time period of approximately three image intervals, which are three television fields. Each field is about 1/60 seconds in duration. Vertical interval test signals which are often times transmitted during the vertical blanking interval at the beginning of each field are indicated by the respective test pulse signals VT. Pulse signals VT are representative and are not intended to portray such signals in actual detail. Picture information is indicated by the waveform of signal VI within each field. The average value of the amplitude of the video signal VS over several fields is indicated by the horizontal broken line VR. Video signal amplitudes corresponding to WHITE and BLACK picture levels are indicated by the levels of the arrows at the left edge of FIG. 3. When picture information is transmitted, the amplitude of the video signal varies between the white and black levels as indicated by the waveforms of signal VI. When a substantially black picture is transmitted, however, the video signal amplitude is low as shown by the low level of signal VI', which is less than the average amplitude signal VR.

As will be described below, in the present embodiment a channel number display is produced unless the video signal VS represents a non-black picture for a field. The embodiment of the present invention shown in FIG. 1 detects a substantially black picture when the output signal from comparator 110 remains high during an entire field of picture information.

A substantially black picture condition is detected by comparator 110 as follows. The video signal VS from television receiver circuitry 41 is applied to the non-inverting (+) input terminal of comparator 110 through a low-pass filter comprising resistor R1 and capacitor C. Because the time constant of the R1-C low-pass filter is selected to be substantially longer than the duration of a TV field, the signal at the interconnection of R1 and C will be substantially equal to the average amplitude VR of video signal VS as shown in FIG. 3. The video signal VS is attenuated by the voltage divider comprising resistors R2 and R3 to develop attenuated video signal VS' which is applied to the inverting (−) input terminal of comparator 110. The resistances of R2 and R3 are selected to ensure that the magnitude of signal VI' for a substantially black picture condition is lower than the magnitude of the average signal VR.

The signal at the output terminal of comparator 110 will be low when the amplitude of VS' exceeds that of VR as is the case when the video signal includes picture information signal VI or the vertical interval test signal VT. When a substantially black picture signal VI' is received, VS' will be less than VR so that the output signal from comparator 110 will be high. The effect of test signals VT is eliminated by FF2 as is described later. Pull-up resistor R4 is coupled between the output terminal of comparator 110 and a source of supply voltage +V.

As a starting point for the following description of operation, assume that flip-flops FF1 and FF2 are initially reset and set, respectively, so that the signals at their respective output terminals Q and $\overline{Q}$ are low, and that flip-flop FF3 is initially reset by delay device 130 so that the signal at its output terminal Q is low. This initial condition is established at or before the end of the vertical blanking interval, i.e., after VT terminates. Because the signal at output terminal Q of FF1 is low, flip-flop 24 is not held reset but is enabled to produce character generating signals at appropriate times as determined by character generator 100.

NOR gate 120 produces a high output signal when the signals applied to all three of its input terminals are low and produces a low output signal for all other combinations of signals at its input terminals. Because flip-flops FF2 and FF3 initially apply low signals to two input terminals of NOR gate 120, NOR gate 120 will produce an output signal which is the inversion (complement) of the output signal from comparator 110.

When video signal VS includes non-black picture information, the output signal of comparator 110 becomes a low signal which causes NOR gate 120 to apply a high signal to the clock input terminal C of flip-flop FF1. In response to that high clock input signal and the high signal +V applied to the D-input of flip-flop FF1, the signal at its output terminal Q becomes high. In response flip-flop 24 in character generator 100 is reset thereby disabling character generator 100 from generating character signals. It is noted that this is the most likely condition because there are ordinarily substantially more fields in which picture information is contained, i.e., non-black fields, than there are fields of substantially black picture information, i.e., black picture fields.

Flip-flop FF1 is reset at the beginning of each field by the vertical signal V supplied from circuitry 41. FF1 being reset initiates the timing period of two-second delay device 130 which will produce an output pulse after two seconds has elapsed if it is not sooner reset. Because FF1 is reset at the 1/60 second field rate when non-black picture fields are present, delay device 130 produces no output signal under non-black picture conditions.

If video signal VS is such as produces a substantially black picture, then the output signal from comparator 110 remains high, and the output signal from NOR gate 120 remains low so that flip-flop FF1 remains reset. This condition enables character generator 110 to produce an on-screen display of channel number.

Once an on-screen channel number character is developed responsive to a substantially black field, it will continue to be developed for a predetermined period of time, e.g., two seconds. Because that time period includes many fields which are likely to include non-black picture information, the reoccurrence of a non-black picture is inhibited from prematurely terminating the on-screen display as follows. Character data supplied from output terminal Q of flip-flop 24 to video blanking device 42 is also applied to the set input terminal S of flip-flop FF3. FF3 is thereby set and produces a high signal at its output terminal Q which is applied to an input terminal of NOR gate 120 thereby inhibiting NOR gate 120 from responding to signal from comparator 110. This inhibiting condition persists for the duration of the time delay provided by two-second delay device 130.

Delay device 130 began timing its two-second period when the signal at output terminal Q of FF1 became low in response to FF1 having been reset by the vertical pulse V applied during the vertical blanking interval preceding the substantially black picture field. After two seconds has elapsed, delay device 130 produces an output pulse signal which is applied to the reset input terminal R of flip-flop FF3, thereby restoring its output signal Q to a low level and re-enabling NOR gate 120. This completes the two-second period during which on-screen characters are displayed. At this time, comparator 110, NOR gate 120 and FF1 become re-enabled for detection of a substantially black field.

Delay device 130 is preferably implemented by a digital counter which counts a clock signal (not shown) and which is reset to a zero count by the output signal at the Q terminal of FF1. Its output signal is taken at the output terminal of a counter stage selected to provide the desired delay time, e.g., 2 seconds.

Flip-flop FF2 prevents NOR gate 120 and flip-flop FF1 from falsely detecting a non-black condition by detecting the vertical interval test signal VT as follows. FF2 is reset by the vertical pulse signal V supplied from character generator 100 at the beginning of the vertical blanking interval. This causes the signal at output terminal $\overline{Q}$ of FF2 to become high, thereby inhibiting NOR gate 120 from responding to the output signal of comparator 110. Thus, when the test signal VT occurs and is detected as a non-black condition by comparator 110, there is no effect upon the reset condition of flip-flop FF1, which reset condition of FF1 will continue if the picture is substantially black.

Horizontal line counter 16 in character generator 100 counts horizontal scan lines by counting the horizontal pulse signal H starting at the beginning of the vertical blanking interval which is indicated by the vertical signal V. At the end of the twenty-one horizontal lines comprising the vertical interval, horizontal line counter 16 develops an output pulse which is applied to the set input terminal S of flip-flop FF2 so that the signal at its output terminal $\overline{Q}$ becomes low. FF2 being set re-enables NOR gate 120 to respond to the output signal from comparator 110 during the picture portion of the field.

To summarize the operation of the apparatus shown in FIG. 1, if a non-black picture is detected, then the development of an on-screen display by character generator 100 is disabled. If, on the other hand, a substantially black screen is detected (i.e., more precisely, if a non-black screen is not detected) then the on-screen channel number display is developed and will be maintained for a predetermined interval (e.g., two seconds).

Because character generator 100 employs digital circuitry to generate character signals, character size may be altered by changing the clock frequency and by decoding different conditions of the various counters in character generator 100 to select timing appropriate for the desired height, width and position of characters for on-screen display. The embodiment shown in FIG. 4 develops half-normal-size characters which are displayed at times other than when a substantially black picture condition is detected.

Specifically, modified character generator 100' generates character signals for developing "normal-size" on-screen channel numbers in accordance with U.S. Pat. No. 3,984,828 referred to above for a predetermined time following detection of a substantially black picture condition as described above in relation to FIG. 1. At other times, character generator 100' generates character signals for developing on-screen characters of one-half that normal size.

Figure 4:
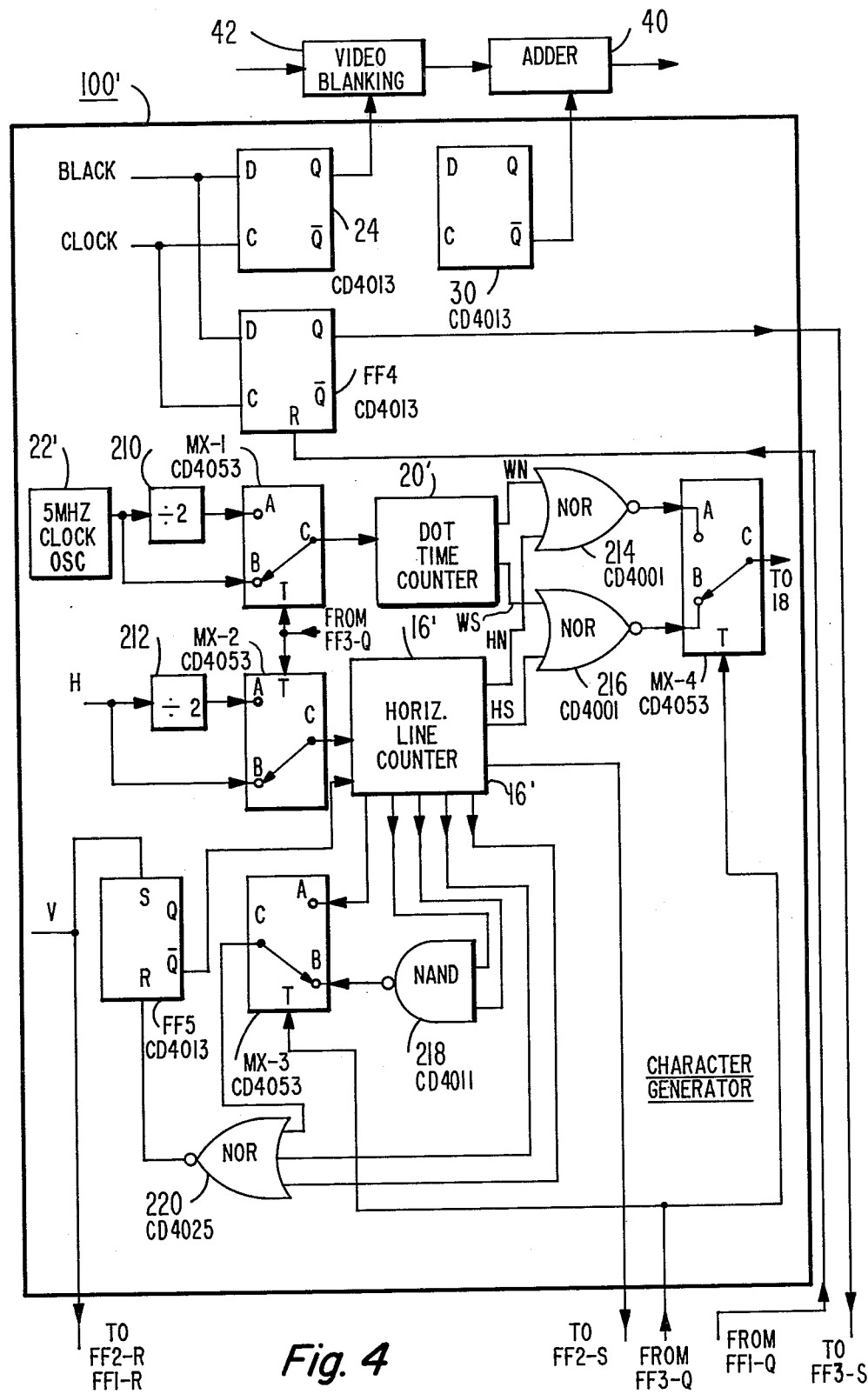
FIG. 4 is a schematic diagram of a modification of the TV receiver as shown in FIGS. 1 and 2.

In FIG. 4, connections to and from flip-flops FF1, FF2 and FF3 (not shown) are indicated by the identification symbol for that flip-flop followed by the designation of the appropriate one of its terminals. For example, a connection to apply a signal to the reset terminal of flip-flop FF2 is designated as "TO FF2-R" and a connection receiving the signal from output terminal Q of FF3 is indicated as "FROM FF3-Q".

In modified character generator 100', flip-flops 24 and FF4 together perform the function of flip-flop 24 of FIG. 1. Flip-flop 24 provides black character signals to video blanking device 42 and flip-flop 30 provides white character signals to adder 40 for together causing an on-screen display of white channel numbers having black edges. When a substantially black screen condition is present (i.e., when a non-black screen is not detected) flip-flop FF4 is reset to enable operation of delay circuit 130 and FF3 as described above for flip-flop 24 in FIG. 1.

Data multiplexers or electronic single-pole-double-throw switches MX-1, MX-2, MX-3 and MX-4 are incorporated in character generator 100' to select between signals corresponding to normal-size character signals and those corresponding to smaller (half-size) character signals. Each multiplexer has an input terminal A receiving signals corresponding to normal-size character signals and an input terminal B receiving signals corresponding to half-size character signals. Each multiplexer further has an output terminal C to which the signal at the selected one of its input terminals A and B is passed. A transfer or switch control signal from output terminal Q of flip-flop FF3 is applied to the respective transfer terminal T of each of MX-1–MX-4. The transfer signal is high when a substantially black picture condition has been detected causing each multiplexer MX-1–MX4 to make connection between its input terminal A and its output terminal C. During non-black picture conditions, the transfer signal is low causing each multiplexer to make connection between its input terminal B and its output terminal C.

A 2.5 Megahertz (MHz) clock signal for normal-size characters is applied to dot-time counter 20' when MX-1 selects input terminal A at which the signal from a 5 Megahertz clock oscillator 22' is applied after being divided by two by frequency divider 210. When half-size characters are to be generated, the 5 MHz clock signal from oscillator 22' is applied to dot-time counter 20' by MX-1 selecting input terminal B. MX-2 applies the horizontal signal H rate divided by two by frequency divider 212 to horizontal line counter 16' when normal-size characters are to be developed and applies the horizontal signal H rate thereto when half-size characters are to be developed.

Dot-time counter 20' develops a normal character width signal WN which is high except at a time comprising twelve cycles of the 2.5 MHz clock signal during each horizontal line corresponding to the position on the TV screen at which a normal-size character is to be displayed. Horizontal line counter 16' develops normal character height signal HN which is high during each vertical field except during twenty horizontal lines over which a normal-size character is to be displayed. NOR gate 214 detects the condition when both WN and HN are low to supply a signal via MX-4 to dot-time decoder 18 (shown in FIG. 2). This signal from NOR gate 214 defines a rectangular area in the picture field in which normal-size channel numbers are displayed.

Dot-time counter 20' also develops half-size-character width signal WS which is high except during twelve cycles of the 5 MHz clock signal which define the width of a half-size character. Horizontal line counter 16' develops half-size-character height signal HS which is high except for a period including ten horizontal lines during each vertical field in which a half-size channel number is displayed. NOR gate 216 detects the coincidence of WS and HS both being low to apply a signal to decoder 18 via MX-4 to define a rectangular area in the picture which has height and width which is one-half that for normal characters. Dot-time counter 20' and horizontal line counter 16' respectively decode signals WN, HN, WS and HS using NAND gates (not shown) having their inputs connected to various ones of their counting stages as is well known to those skilled in the art of digital circuit design.

It is noted that by appropriately selecting the respective times at which signals WN, HN, WS and HS occur in relation to the horizontal blanking interval and the vertical blanking interval permits the characters to be positioned anywhere on the screen on the TV receiver. To this end horizontal line counter 16' is enabled to count the cycles of horizontal signal H when the vertical pulse signal V sets flip-flop FF5 causing the signal at its terminal $\overline{Q}$ to become low. FF5 is reset to reset line counter 16' to a zero count when line counter 16' reaches a predetermined line count. The input terminals of NOR gate 220 are connected to appropriate ones of the counting stages in counter 16' to detect the predetermined line count. Owing to the operation of divider 212 and multiplexer MX-2, horizontal line counter 16' will count twice as many horizontal lines when half-size characters are developed as when normal characters are developed. If only the actual last line of a field were to be detected by NOR gate 220 to reset FF5, then half-size characters could be generated at two or more places, each vertically under the other, on the TV screen. To avoid this undesirable effect, MX-3 and NAND gate 218 are interposed between counter 16' and NOR gate 220. NOR gate 220 is thereby connected to appropriate counting stages in counter 16' to detect the horizontal line next following the generation of either normal or half-size characters and to reset flip-flop FF5 at that time. This causes horizontal line counter 16' to become and remain reset for the remainder of that field and to not be enabled to count until the next vertical blanking interval at which time the next vertical pulse V sets FF5.

In each of FIGS. 1 and 4, commercial part numbers of integrated circuits satisfactory for use in the apparatus shown are indicated below the respective reference designations. These integrated circuits are sold by RCA Corporation, Solid-State Division, Somerville, N.J. In addition, certain component values are similarly indicated by way of example for typical levels of television signals found in U.S. television receivers such as the CTC 93 receiver sold by RCA Corporation, Consumer Electronics, Indianapolis, Ind.

Modifications to the above-described embodiments are contemplated to be within the scope of the present invention as defined by the claims following. For example, all-white channel numbers can be generated by disconnecting output terminal Q of flip-flop 24 from the video blanking device 42 and by connecting output terminal $\overline{Q}$ of flip-flop 24 to adder 40. While resistors R2 and R3 in FIG. 1 are shown as fixed resistors, a potentiometer could be substituted so that the amplitude level of VS at which a substantially black picture is detected can be adjusted during production or by the TV viewer.

In addition, it is understood that the present invention may be employed with other character generators such as one which displays a bar on the screen, the position of which bar is indicative of the approximate channel selected.

By way of further example, delay device 130 can be a retriggerable monostable multivibrator which is triggered in response to the output signal Q of flip-flop FF1. Still further, the circuitry coupling the video signal to comparator 110 could comprise a low-pass filter to one input of comparator 110 and a peak detecting circuit coupled to the other input thereof, however, such embodiment culd be more susceptible to detecting noise signals as an indication of a non-black picture.

What is claimed is:

1. In a television receiver which develops an image on an image display device in response to a video signal occurring during image intervals, apparatus for selectively developing a character on said display device comprising:

means for generating character signals to produce on said display device said character in response to a character command signal;

detector means for detecting a predetermined amplitude condition of said video signal over a portion of said image interval; and command means responsive to said detector means detecting said predetermined amplitude condition for generating said character command signal.

2. The apparatus of claim 1 wherein said character represents a television channel which is selected by said television receiver.

3. The apparatus of claim 1 wherein said predetermined amplitude condition corresponds to said video signal developing a substantially blank image on said display device.

4. The apparatus of claim 3 wherein said detector means comprises comparator means for comparing the amplitude of said video signal to that of a reference signal for detecting said predetermined amplitude condition.

5. The apparatus of claim 4 wherein said detector means further comprises averaging means to which said video signal is coupled for generating a first signal responsive to the average value of the amplitude of said video signal and means for applying said first signal to said comparator means as said reference signal.

6. The apparatus of claim 5 wherein said averaging means comprises a low-pass filter having a time constant longer than the duration of said image interval.

7. The apparatus of claim 1 wherein said command means includes delay means responsive to the generation of said command signal for maintaining said command means in the condition generating said command signal for a predetermined time interval subsequent to the generation of said command signal.

8. In the apparatus of claim 1 wherein said video signal includes a pulse signal defining the beginning of said image interval, said command means comprising:
   bistable means for providing first and second states, said bistable means having an output for generating said command signal when said bistable means is in said first state;
   first means coupling said detector means to said bistable means for putting said bistable means in said first state when said predetermined amplitude condition is detected; and
   second means for putting said bistable means in said second state in response to said pulse signal.

9. The apparatus of claim 8 wherein said command means includes delay means coupled between the output of said bistable means and said first means and responsive to the generation of said command signal for inhibiting operation of said first means for a predetermined time interval subsequent to the generation of said command signal.

10. In the apparatus of claim 1 wherein said video signal includes a pulse signal defining the beginning of said image interval, said command means comprising means responsive to said pulse signal for inhibiting operation of said command means for a predetermined portion of said image interval.

11. The apparatus of claim 10 wherein said means for inhibiting comprises:
   bistable means for providing first and second states, said command means being inhibited when said bistable means is in said first state;
   first means coupling said pulse signal to said bistable means for putting said bistable means in said first state; and
   second means for putting said bistable means in said second state at a predetermined time subsequent to its having been put in said first state.

12. In the apparatus of claim 11 wherein said image display device is of a type having a raster scanned display during said image interval, said second means including means for counting a predetermined number of the scanning lines of said raster.

13. The apparatus of claim 1, 3, 4, 7 or 10 wherein said means for generating character signals comprises:
   a source supplying said character signals for producing said character having predetermined size on said display device at times when said command signal is applied; and
   means coupled to said source for modifying said character signals for making said character to have a different predetermined size at times other than when said command signal is applied.

14. The apparatus of claim 13 wherein said character signal source comprises:
   a counter means having a clock terminal for receiving a clock signal, the frequency of which determines the predetermined size of said character; and
   a first clock signal source for applying a first clock signal at a first frequency to said clock terminal.

15. The apparatus of claim 14 wherein said means for modifying includes:
   switch means having first, second, and third terminals for selectively making connection between said first and third terminals at said times when said command signal is applied and between said second and third terminals at said other times;
   a second clock signal source for applying a second clock signal at a second frequency to said second terminal;
   means for interposing said switch means between said first clock signal source and said counter means including means for applying said first clock signal to said first terminal and means for coupling said third terminal to the clock terminal of said counter means.

* * * * *

UNITED STATES PATENT AND TRADEMARK OFFICE
CERTIFICATE OF CORRECTION

PATENT NO. : 4,430,671
DATED : February 7, 1984
INVENTOR(S) : Gregory G. Tamer

It is certified that error appears in the above-identified patent and that said Letters Patent is hereby corrected as shown below:

Column 1, line 11, "on" should be --of--.
Column 1, line 26, "convenient" should be --inconvenient--.
Column 1, line 38, "ensures" should be --endures--.
Column 1, line 68, "signal" should be --signals--.
Column 3, line 39, "characte" should be --character--.

Signed and Sealed this

Ninth Day of October 1984

[SEAL]

Attest:

GERALD J. MOSSINGHOFF

Attesting Officer

Commissioner of Patents and Trademarks